US006209852B1

(12) United States Patent
George et al.

(10) Patent No.: US 6,209,852 B1
(45) Date of Patent: Apr. 3, 2001

(54) REMOVABLE CHAIN HOIST POSITION ENCODER ASSEMBLY

(75) Inventors: David W. George, Long Beach; Christopher E. Guth, Santa Ana; Ivan J. Morgan, Long Beach; Glenn R. Bracegirdle, San Pedro; Thomas G. Booth, Long Beach; Richard J. Romano, San Jose; Robert A. Fry, Tustin, all of CA (US)

(73) Assignee: George & Goldberg Design Assoc., Paramount, CA (US)

( * ) Notice: Subject to any disclaimer, the term of this patent is extended or adjusted under 35 U.S.C. 154(b) by 0 days.

(21) Appl. No.: 09/404,689

(22) Filed: Sep. 24, 1999

(51) Int. Cl.[7] .................................. B66D 3/26; G01B 3/12

(52) U.S. Cl. ............................ 254/372; 254/270; 33/734; 33/743

(58) Field of Search ..................................... 33/1 PT, 732, 33/734, 743, 753; 254/270, 372

(56) References Cited

U.S. PATENT DOCUMENTS 219,237 9/1879 Ennett .
697,772 4/1902 Allison .
2,477,783 8/1949 Britt .
2,991,976 7/1961 Carroll .
3,399,868 9/1968 Reischl .
3,661,279 5/1972 Macrander .
3,960,362 6/1976 Griffiths et al. .
4,005,852 2/1977 Schmitmeyer et al. .
4,175,727 11/1979 Clarke .
4,205,453 * 6/1980 Steele .................................. 33/1 PT
4,570,348 * 2/1986 Amsler et al. ......................... 33/734
4,953,829 9/1990 Knaack et al. .
5,299,780 4/1994 Sugiyama .
5,566,925 10/1996 Wada et al. .
5,790,407 8/1998 Strickland et al. .

* cited by examiner

*Primary Examiner*—Katherine A. Matecki
(74) *Attorney, Agent, or Firm*—Charles H. Thomas

(57) ABSTRACT

A chain hoist having a casing into which and with respect to which a chain travels is provided with an externally mounted position encoder assembly. A releasable connector, such as a ratchet strap, is employed to firmly but removably couple the position encoder assembly housing externally on the chain hoist casing. The releasable connector holds the position encoder assembly housing in a fixed position relative to the chain hoist casing. The position encoder assembly has a chain gear that is rotatably mounted relative to the position encoder assembly housing proximate to the chain access opening in the chain hoist casing. The precision encoder assembly chain gear engages the portion of the chain that is maintained under tension at a location externally of the chain hoist casing and rotates as the chain travels relative to the chain hoist casing. A releasable clamp is anchored relative to the position encoder assembly housing and is engageable to maintain engagement of the position encoder assembly chain gear with the chain. An encoder is mounted with respect to the position encoder assembly housing and detects rotational movement of the position encoder assembly chain gear. The sensor provides electrical output signals indicative of the extent and direction of rotational movement of the position encoder assembly chain gear. The position encoder assembly provides precise, reliable output signals indicative of the position of the chain relative to the chain hoist. The position encoder assembly may be readily removed from the chain hoist, and just as easily attached thereto.

19 Claims, 10 Drawing Sheets

REMOVABLE CHAIN HOIST POSITION ENCODER ASSEMBLY

BACKGROUND OF THE INVENTION

1. Field of the Invention

The present invention relates to a chain hoist position encoder assembly which may be removably attached externally on the casing of a chain hoist to track the movement of the load carried by the chain hoist relative to a fixed location.

2. Description of the Prior Art

Chain hoists are utilized in many different applications to raise and lower loads suspending from overhead supports. A chain hoist is comprised of a heavy-duty motor housed within a rugged casing and having at least one chain access opening in the casing. A chain may be suspended from an overhead support or from the chain hoist itself to carry a load. In either case the chain is routed around a chain drive gear located within the chain hoist casing. The chain drive gear within the casing is driven by the chair hoist motor. The slack portion of the chain, after passing around the drive gear within the casing, is routed back out through the chain opening and hangs from the chain hoist casing as a slack end having a length that varies with the position of the chain hoist casing relative to the overhead support or with the position of the load relative to the chain hoist casing.

The chain hoist motor, through the internal chain drive gear within the casing, pulls either the load or the motor casing vertically upward, or allows the load or chain motor casing to travel vertically downward. The travel of the chain hoist casing or the load vertically up and down is controlled by switches located remotely from the chain hoist casing and coupled to the chain hoist motor by means of an electrical control cable. One or more hooks that are attached to the chain motor casing suspend a load beneath the chain hoist casing. This load is raised and lowered, under the control of the chain hoist operator switches, by the upward and downward travel of the load or the chain hoist along the portion of the chain which is under tension and from which the chain hoist is suspended or by pulling chain in and playing chain out from the casing. One such conventional chain hoist is described in U.S. Pat. No. 2,991,976, while another is described in U.S. Pat. No. 3,960,362.

Chain hoists are utilized extensively and in widely differing applications. They are used in shops, factories, warehouses, shipyards, and numerous other types of commercial and industrial establishments. In many applications of commercially available chain hoists the position of the chain hoist motor and casing relative to the length of the suspended chain upon which it travels or the position of the chain which travels relative to it may be controlled merely by observing either the chain hoist itself, or the load suspended from it. Adjustments to the vertical position of the chain or chain hoist may be performed merely by providing manual inputs to the chain hoist control switches. Indeed, a simply manually operated control is sufficiently accurate for many, many chain hoist applications that do not require precise position control.

On the other hand, there are some applications in which precision control of the chain hoist is required. In the theatrical industry stage sets and props are often moved vertically utilizing general purpose chain hoists, but this movement must be controlled with great precision. For example, different portions of a stage prop may be moved vertically relative to the stage and relative to each other in a closely controlled and intricate sequence and at precise speeds in order to produce special theatrical effects. Precision control of general purpose chain hoists is often necessary in other applications as well. For example, precision control of a general purpose chain hoist may likewise be required at trade shows and expositions in order to create special effects or in order to move interdependent loads in a complex manner. Where precision control of a chain hoist is necessary, visual observation and corresponding adjustment utilizing manual controls is very inadequate and unacceptable.

To provide the necessary precision control for specific applications of general purpose chain hoists, various position-encoding systems have been devised. However, all of these prior position-encoding systems have involved modifications to the chain hoist within the structure of the chain hoist casing. For example, some conventional position-encoding systems for chain hoists have involved the installation of an optical or magnetic encoder within the casing of the chain hoist to sense the rotation of the chain hoist motor or the gear that engages the chain and which is driven by the chain hoist motor within the casing. The internally installed encoder provides corresponding electrical position output signals.

While such conventional position-encoding systems do provide the required positional information, they have significant disadvantages. For one thing, they can be installed within a chain hoist casing only by a person who has extensive knowledge of the internal operations of the components of a chain hoist. The services of such individuals are expensive and often are not readily available.

A further significant disadvantage of such conventional chain hoist encoder systems is that once the chain hoist casing is opened, the manufacturer's warranty for the chain hoist is voided. This is only reasonable since if a person without sufficient expertise attempts to install a position encoder within the casing of a chain hoist, connections can easily be made or broken that will cause permanent damage to the chain hoist and cause it to malfunction. Moreover, tampering with the internally protected components of a chain hoist by persons lacking sufficient expertise can result in alterations to the chain hoist that can cause vary hazardous malfunctions. This can lead to significant property damage and personal injury when the chain hoist is thereafter operated.

SUMMARY OF THE INVENTION

The present invention involves the provision of a position encoder assembly for a general purpose chain hoist that can be attached to and detached from the chain hoist casing, and which requires no internal connections within the chain hoist casing. Moreover, the position encoder assembly of the invention is readily removable and may be attached to and removed from the exterior of the chain hoist casing in merely a matter of seconds. Nevertheless, it provides highly accurate encoded position information that meets or exceeds the accuracy of position encoders that are internally wired within the casing of a chain hoist.

The present invention has significant advantages over conventional systems in that no particular knowledge of the internal operation of the chain hoist is required in order to properly mount the position encoder assembly of the invention on the casing of the chain hoist. Installation and removal may be performed by virtually any unskilled laborer.

A further very significant advantage of the present invention is that the position encoder assembly of the invention may be removably installed upon the casing of a chain hoist totally externally of the operating mechanism of the chain hoist. As a consequence, installation does not require the chain hoist casing to be opened, nor does it require any internal connections to the operating components of the chain hoist. As a result, the installation of the position encoder assembly of the invention on a chain hoist does not void or in any way affect the warranty provided by the chain hoist manufacturer.

A further advantage of the position encoder assembly of the invention is that all exposed components are highly rugged and durable and not readily susceptible to damage. Nevertheless, the position encoder assembly of the invention produces encoded position and direction signals which are highly precise and which may be provided as inputs to a computer-controlled system, thereby enabling a high degree of precision control of the operation of the chain hoist.

A further advantage of the removable position encoder assembly of the invention is that it is readily adaptable for installation on a wide variety of commercially available chain hoist equipment produced by different manufacturers. Chain hoists that are produced by different manufactures, and even different models of chain hoists produced by the same manufacturer, often have significant differences in their operating components and external configuration. However, the position encoder assembly of the present invention is installed and operated in such a way that it may be utilized with most commercially available, general purpose chain hoists. The only significant variable that must be taken into account is the link size and configuration of the chain utilized by the chain hoist upon which the position encoder assembly is installed. However, there are only a very limited number of different chain sizes and configurations with which conventional, general purpose chain hoists are utilized commercially.

In one broad aspect the present invention may be considered to be a removable position encoder assembly for attachment to a chain hoist that has a casing into which and with respect to which a chain travels. The removable position encoder assembly of the invention comprises: a position encoder assembly housing; a releasable connector that firmly couples the position encoder assembly housing externally on the chain hoist casing and holds the position encoder assembly housing in a fixed position relative to the chain hoist casing; a position encoder assembly chain gear rotatably mounted relative to the position encoder assembly housing so that the position encoder assembly chain gear engages the chain externally from the chain hoist casing as the chain travels relative to the chain hoist casing; a releasable clamp anchored to the position encoder assembly housing and engageable to maintain engagement of the position encoder assembly chain gear with the chain so that linear movement of the chain produces a proportional rotational movement of the position encoder assembly chain gear; and an encoder mounted on the position encoder assembly housing and which detects rotational movement of the position encoder assembly chain gear and provides output signals indicative of the extent and direction of rotational movement of the position encoder assembly chain gear relative to the chain hoist casing.

Preferably the releasable connector by means of which the position encoder assembly housing is attached to the chain hoist casing is formed of a ratchet strap. The belt of the ratchet strap passes through the position encoder assembly housing and about the chain hoist casing. A ratchet mechanism on the ratchet strap that includes a ratchet wheel and a pawl is cinched to from a loop that tightly grips the chain hoist casing therewithin. As a result, the position encoder assembly housing is releasably but tightly strapped against the outside surface of the chain hoist casing.

In another aspect the invention may be considered to be an position encoder assembly removably and externally attachable to a chain hoist having a casing with a chain that enters the casing. The position encoder assembly of the invention comprises: a position encoder assembly body; a releasable connector that is engageable to secure the position encoder assembly body to the chain hoist casing in a fixed disposition relative thereto and which is disengageable to permit removal of the position encoder assembly body from the chain hoist; a position encoder assembly chain gear mounted for rotation relative to the position encoder assembly body and engageable with the chain externally of the chain hoist casing; a releasable clamp mounted on the position encoder assembly body and which is operable to hold the chain in engagement with the position encoder assembly chain gear and alternatively to release the chain from the position encoder assembly chain gear; and an encoder mounted on the position encoder assembly body and which is responsive to rotation of the position encoder assembly chain gear to emit signals indicative of the direction and extent of rotation of the position encoder assembly chain gear relative to the position encoder assembly body. The linear movement of the chain produces a proportional rotational movement of the position encoder assembly chain gear.

In still another aspect the invention may be considered to be an improvement in a chain hoist having a casing with a chain opening and a chain extending into the opening. The improvement of the invention comprises: a detachable position encoder assembly including a position encoder assembly frame removably attached to the exterior of the chain hoist casing and which includes a position encoder assembly gear mounted on the position encoder assembly frame for rotation relative thereto and engageable with the chain; a releasable clamp anchored to the position encoder assembly frame and operable to alternatively hold the chain in engagement with the position encoder chain gear and to release the chain from the position encoder chain gear; and an encoder mounted on the position encoder assembly frame and which detects rotation of the position encoder chain gear relative to the position encoder assembly frame and provides output signals indicative of the direction and extent of rotation of the position encoder chain gear relative to the position encoder assembly frame.

The invention may be described with greater clarity and particularity by reference to the accompanying drawings.

DESCRIPTION OF THE EMBODIMENT

Figure 1:
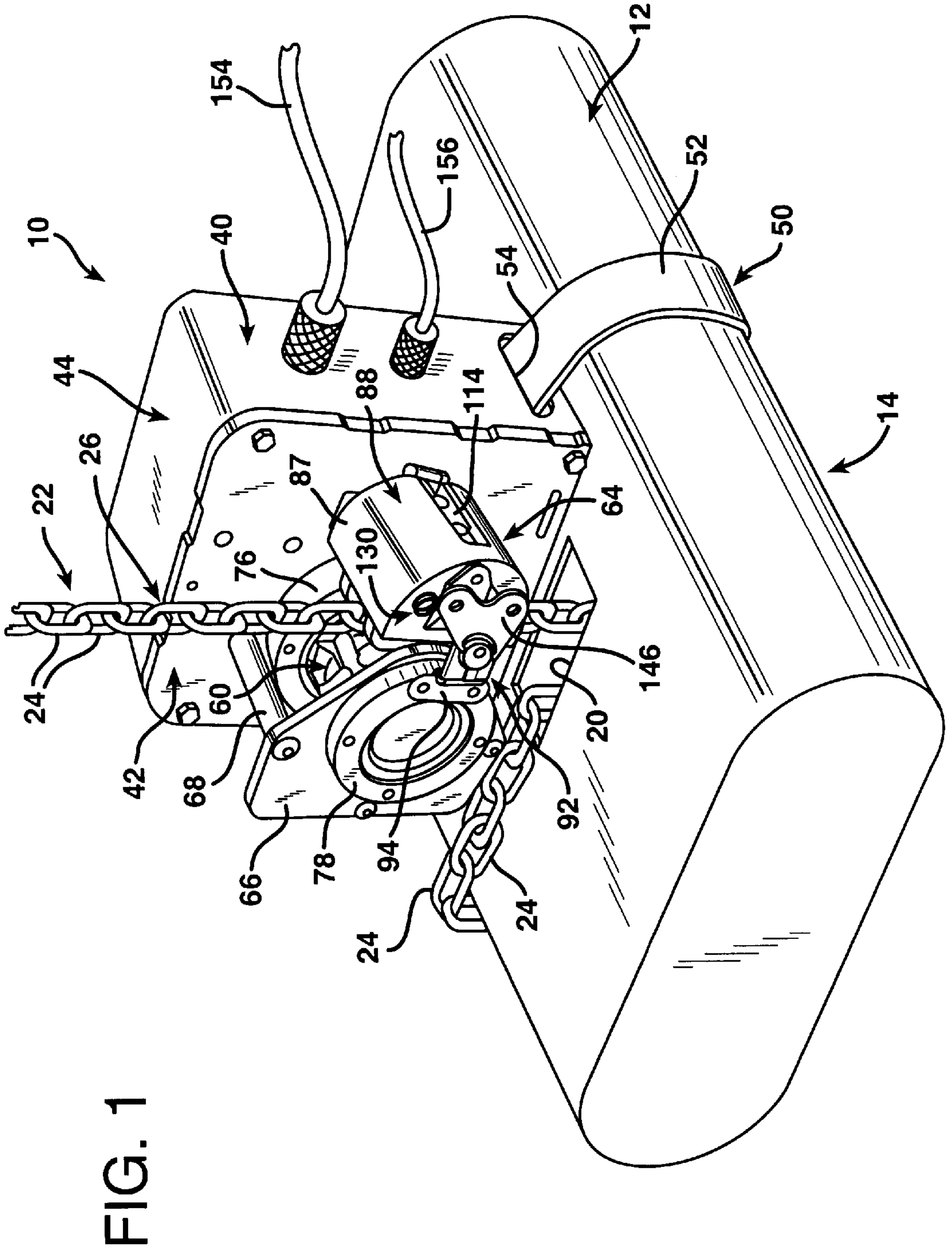
FIG. 1 is a perspective view illustrating a preferred embodiment of a position encoder assembly according to the invention releasably mounted on a conventional chain hoist.
Figure 2:
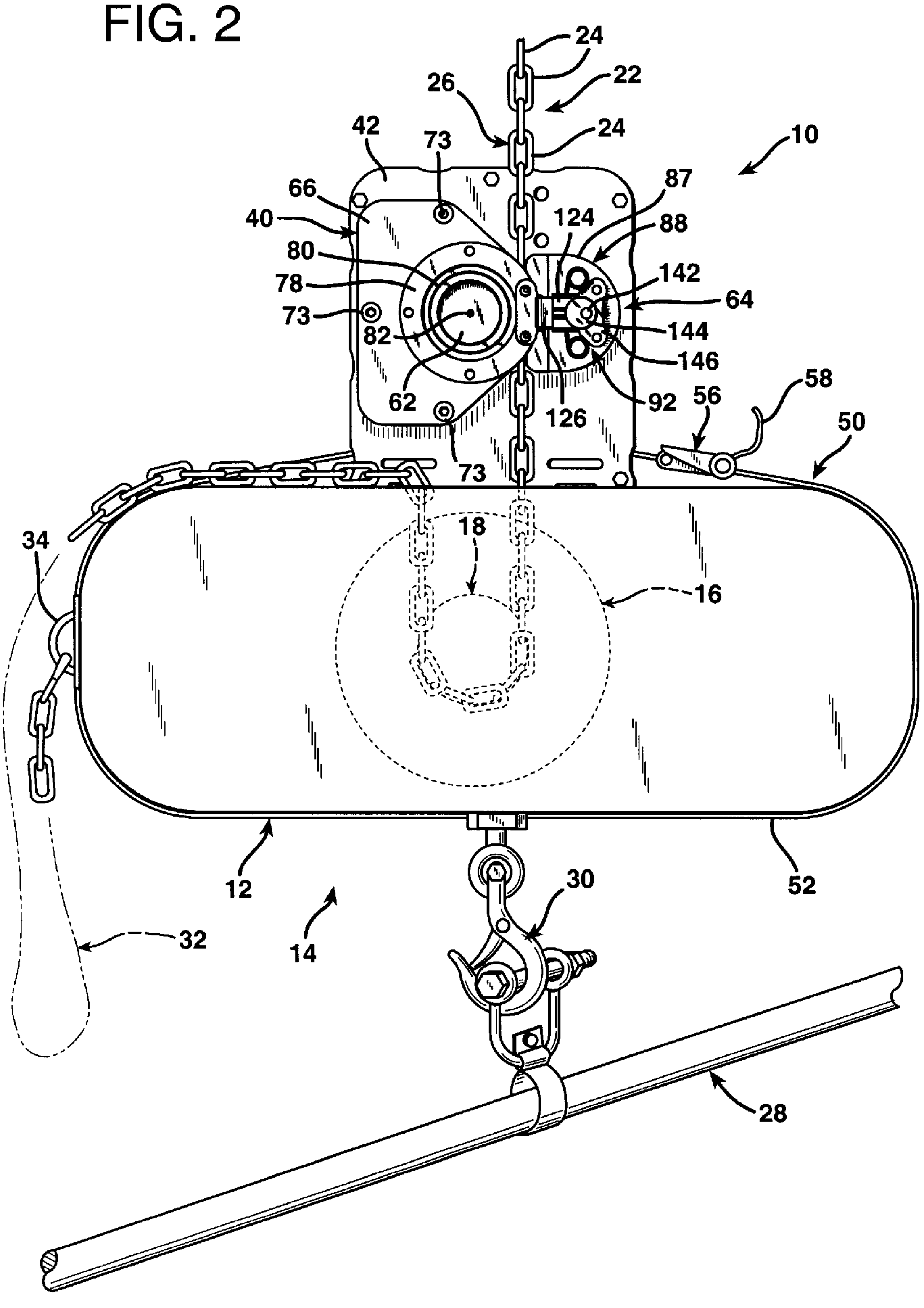
FIG. 2 is a front elevational view illustrating the improved chain hoist of FIG. 1 with a load suspended therebeneath.

FIGS. 1 and 2 illustrate a dual sensor position encoder assembly 10 according to the invention removably mounted externally atop the casing 12 of a conventional, general purpose chain hoist 14. The casing 12 of the chain hoist 14 is a rugged, durable, encompassing steel shell that encloses a chain hoist motor 16 and an internal chain hoist drive gear 18 therewithin. The chain hoist motor 16 and the internal chain hoist drive gear 18 are conventional and are illustrated in phantom in FIG. 2. The chain host motor 16 is rigidly mounted within the casing 12 and the internal chain hoist drive gear 18 is fixed to the drive shaft of the motor 16.

As best illustrated in FIG. 1, the chain hoist casing 12 has a rectangular chain access opening 20 defined therein. In the arrangement illustrated in FIGS. 1 and 2, the chain hoist 14 is suspended from an overhead support (not shown) in a conventional manner by a chain 22 having a multiplicity of chain links 24. The links 24 are each formed as obloid steel rings linked together. Each of the links 24 resides in a plane oriented at right angles relative to the plane of orientation of the links 24 immediately adjacent thereto.

In the arrangement of FIGS. 1 and 2 the chain 22 extends downwardly from the overhead support and is engaged in an arcuate, semicircular loop around the internal chain hoist drive gear 18. The vertically extending portion 26 of the chain 22 that is suspended from the overhead support is under tension due to the weight of the chain hoist 14 and the weight of the load 28 that is suspended therefrom by means of a hook 30 depending from the underside of the chain hoist casing 12, as shown in FIG. 2. The slack portion 32 of the chain 22 emanates from the chain access opening 20 in the chain hoist casing 12 and hangs in a loop which may be secured to the side of the chain hoist casing 12 by means of an eye-pad 34, as illustrated in FIG. 2. The structure of the chain motor 14, the chain 22 from which it is suspended, the hook 30, and the load 28 are entirely conventional in structure and arrangement.

The position encoder assembly 10 of the invention, on the other hand, is a unique article of manufacture. The position encoder assembly 10 is formed with a position encoder assembly frame that is configured as a position encoder assembly body or housing 40. The position encoder assembly housing 40 has a flat, front base plate 42 and a cover 44 shaped as a concave shell that encloses and protects two different optical encoders, sensors, or transducers 46 and 48, illustrated in FIGS. 7 and 8. The housing cover 44 is attached to the front base plate 42 by machine screws that are secured through screw openings 43 in the base plate 42. The position encoder assembly 10 also includes a releasable clamp indicated generally at 64 in the drawings.

The position encoder assembly housing 40 is removably attached to the exterior of the chain hoist casing 12 by means of a releasable connector in the form of a ratchet strap 50. The ratchet strap 50 removably attaches the position encoder assembly housing or frame 40 to the exterior of the chain hoist casing 12. The ratchet strap 50 includes a heavy-duty belt 52 which passes through a pair of slots 54, closed at both ends and located near the lower edges on opposite sides of the housing shell 44. The belt 52 of the ratchet strap 50 passes through the structure of the housing 40 and encircles the chain hoist casing 12. The ratchet strap 50 has a conventional ratchet cinching mechanism 56 that engages the tail 58 of the belt 52 so that the ratchet strap 50 can be cinched firmly to form a loop that tightly grips the chain hoist casing 12 therewithin, as illustrated in FIGS. 1 and 2. The ratchet mechanism 56 may be released in a conventional manner, if desired, thereby releasing the tail end 58 of the belt 52. The ratchet strap 50 thereby releasably holds the position encoder assembly housing 40 tightly against the chain hoist casing 12, as best illustrated in FIGS. 1 and 2. The ratchet strap 50 allows the position encoder assembly 10 to be totally separated from or attached to the chain hoist 14 in a matter of seconds.

Figure 3:
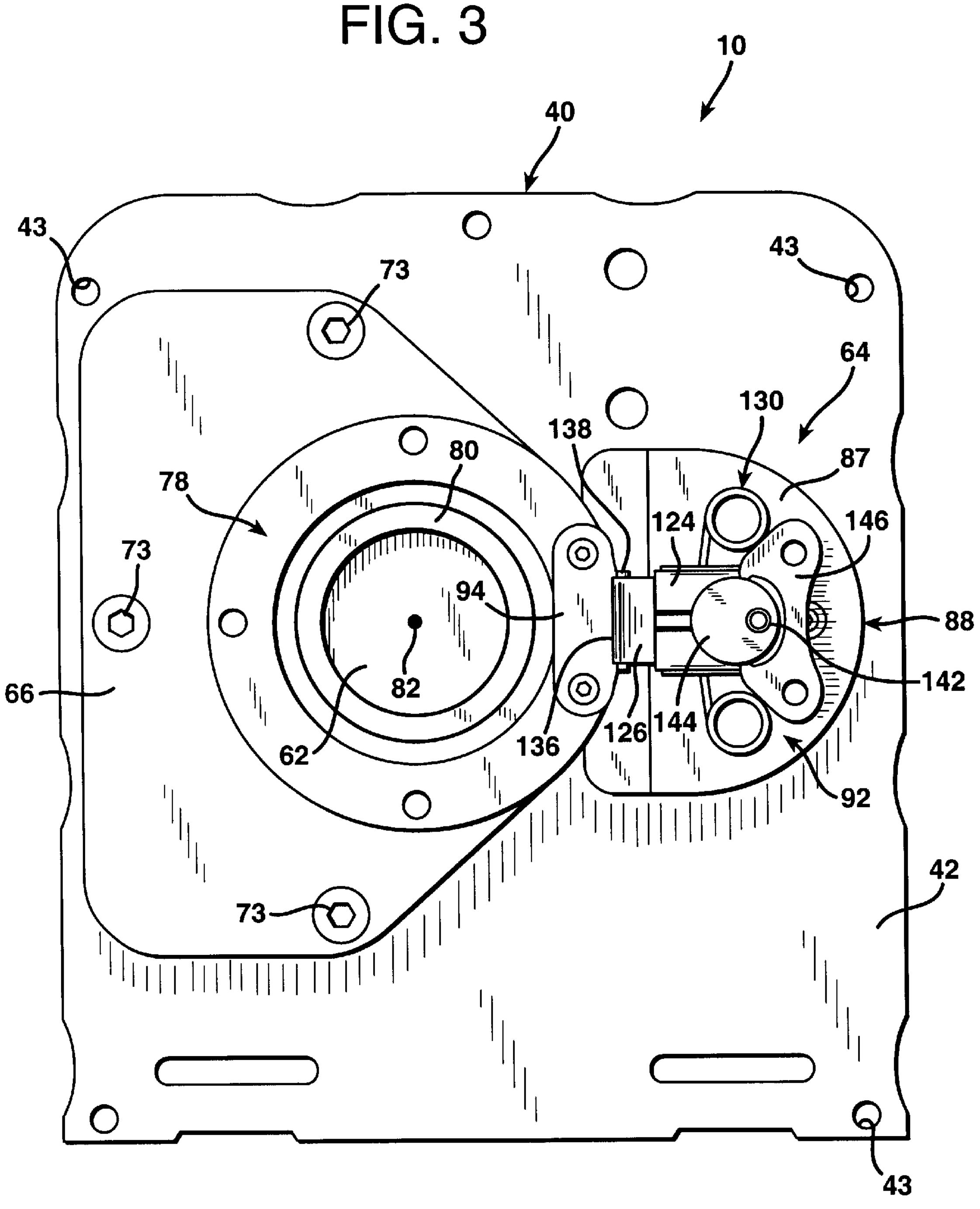
FIG. 3 is an enlarged front elevational view of the position encoder assembly shown in FIG. 2.
Figure 4:
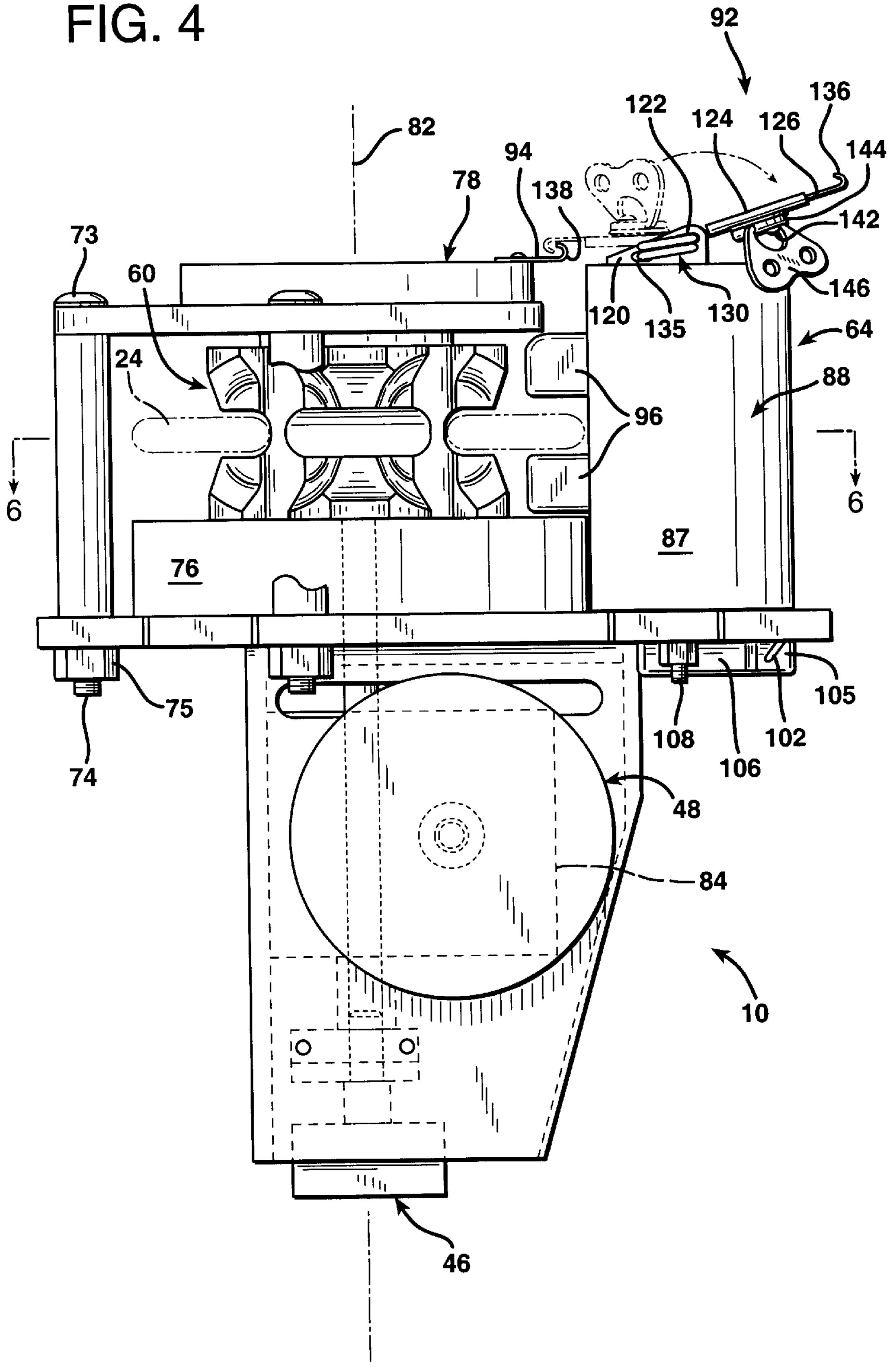
FIG. 4 is a bottom plan view of the position encoder assembly of FIG. 2 shown with the cover of the housing thereof removed and with the manner of disengagement of the releasable clamp thereof illustrated.
Figure 4A:
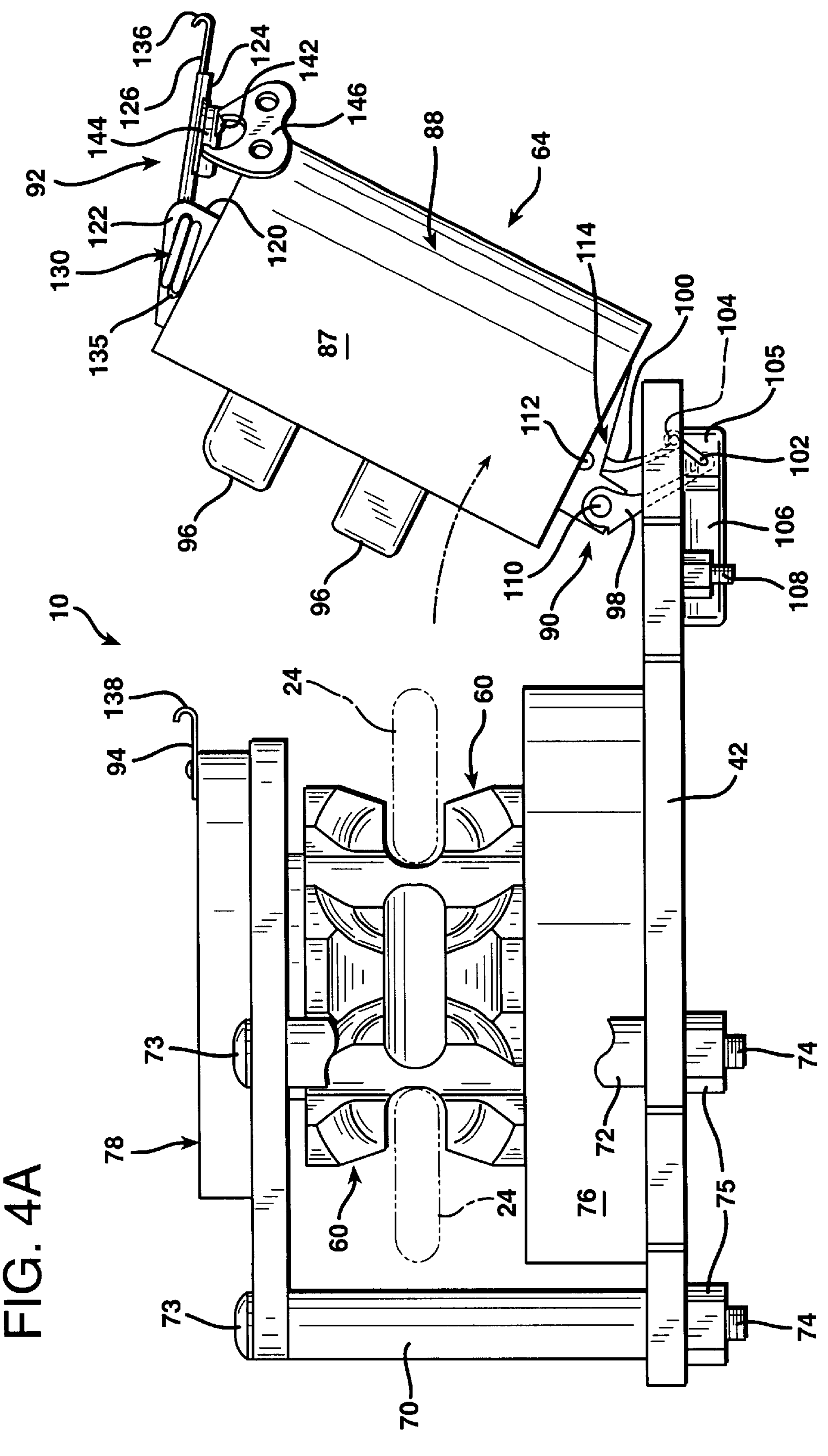
FIG. 4A is an enlarged view of the upper portion of FIG. 4 showing the releasable clamp thereof moving to a disengaged position.

The position encoder assembly 10 includes a position encoder assembly chain gear 60, best illustrated in FIGS. 4 and 4A, mounted on a gear shaft 62. The outboard end of the gear shaft 62 is visible in FIGS. 1, 2, and 3. The position encoder assembly chain gear 60 is formed of steel and is rigidly secured to the cylindrical steel gear shaft 62 by means of a key, lock nut, set screw, or any other conventional means.

In addition to the flat base plate 42, the housing 40 also includes a flat axle mounting plate 66 spaced from and held parallel to the base plate 42 by means of three hollow spacing sleeves 68, 70, and 72. The spacing sleeves 68, 70, and 72 are interposed between aligned bolt openings in the axle mounting plate 66 and in the base plate 42. Machine bolts 74 extend through the axle mounting plate 66, through the spacing sleeves 68, 70, and 72, and through the base plate 42. The machine bolts 74 have heads 73 that bear against the outside surface of the mounting plate 66 and clamping nuts 75 that bear against the back side of the base plate 42, as best illustrated in FIGS. 4 and 4A. The axle mounting plate 66 is thereby rigidly held at a distance spaced from and parallel to the base plate 42. The base plate 42 and the axle mounting plate 66 serve as bearing plates.

Figure 5:
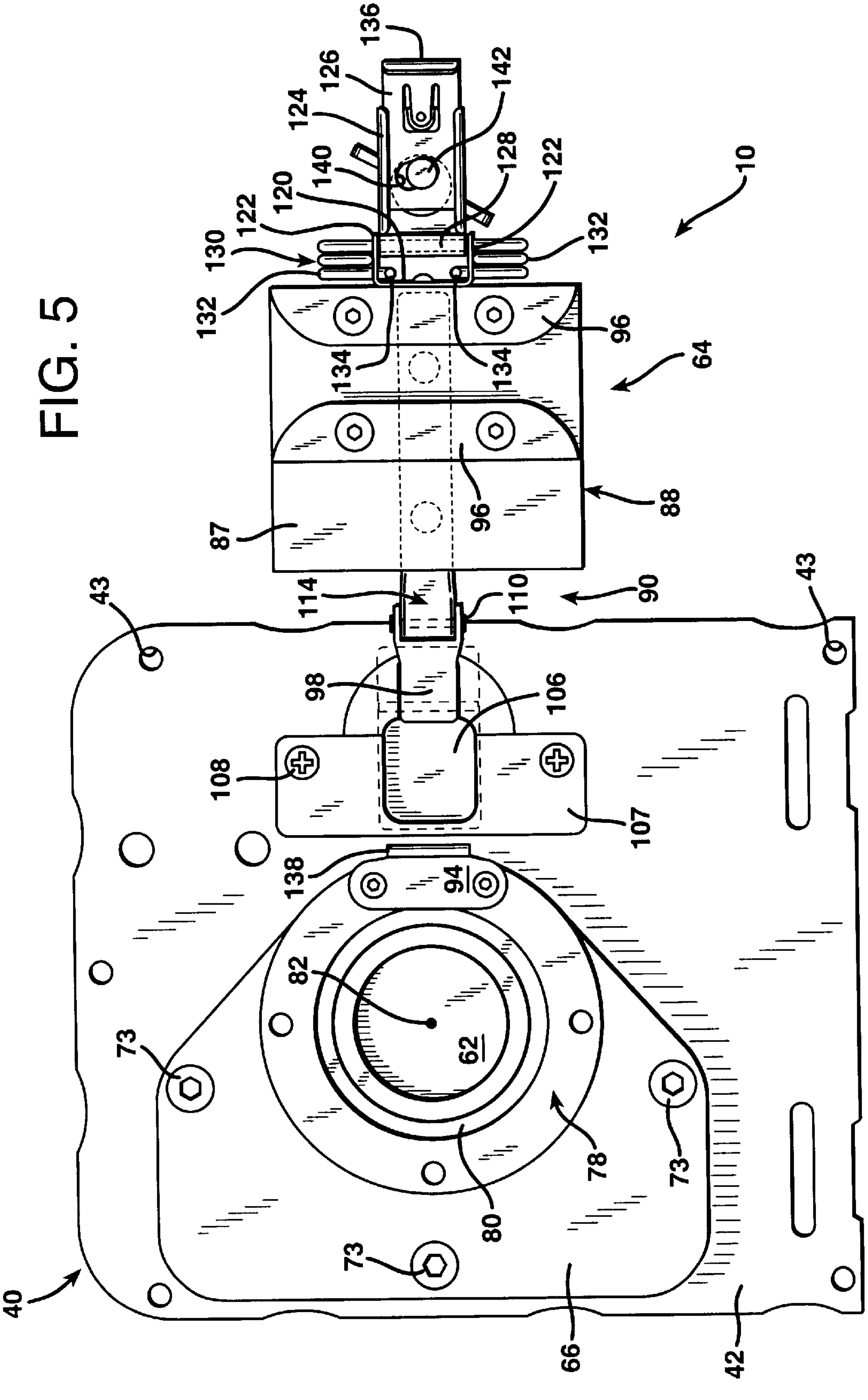
FIG. 5 is a front elevational view of the position encoder assembly of FIG. 2 shown with the releasable clamp thereof completely disengaged.
Figure 6:
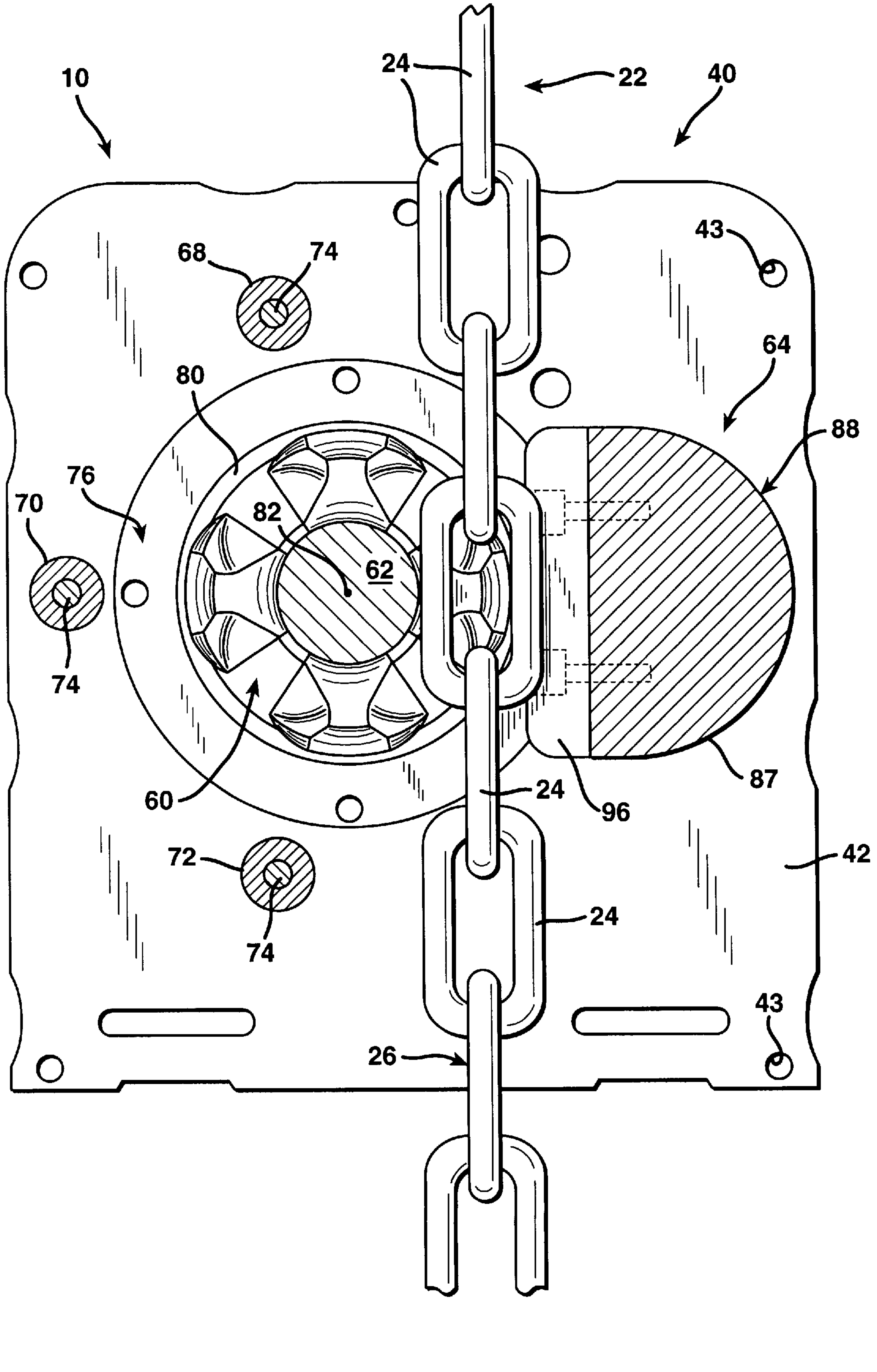
FIG. 6 is a sectional elevational view taken along the lines 6—6 of FIG. 4.
Figure 7:
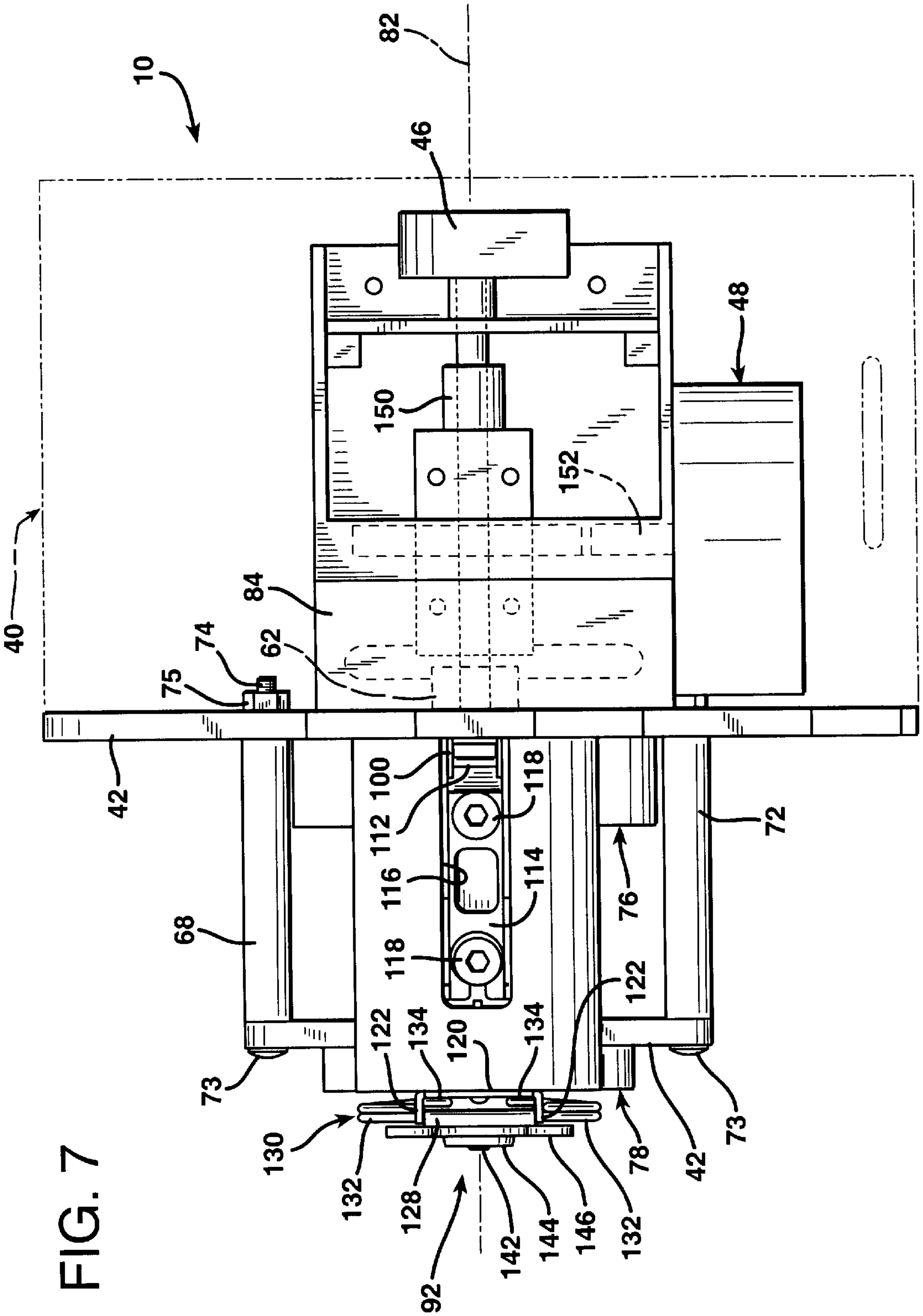
FIG. 7 is a right-side elevational view of the position encoder assembly as shown in FIG. 3.

As illustrated in FIGS. 1, 6, and 7, an inner bearing assembly 76 is bolted to the outwardly facing surface of the base plate 42. An outer bearing assembly 78 is bolted to the outwardly facing surface of the outer axle mounting plate 66 as shown in FIGS. 1–5 and 7. The bearing assemblies 76 and 78 each include a ball bearing ring 80 that permits the position encoder assembly chain gear shaft 62 to rotate smoothly therewithin and relative to the fixed outer portions of the bearing assemblies 76 and 78. The axle 62 is formed of a solid steel rod that carries the position encoder assembly chain gear 60 in rotation about a position encoder assembly chain gear axis of rotation, indicated at 82, that is perpendicular to both the base plate 42 and the axle mounting plate 66. One end of the position encoder assembly chain gear axle 62 terminates within the bearing ring 80 of the outer bearing ring assembly 78, while the other end of the axle 62 extends in the opposite direction through the bearing ring assembly 76 and into a gearbox 84, visible in FIGS. 7 and 8.

The releasable clamp 64 is formed of a semicylindrical aluminum clamp block 87, a hinge assembly 90, a latch assembly 92, a catch 94, and a pair of Teflon® guide guides 96 that are bolted to the flat, inwardly facing surface of the semicylindrical clamp block 87. Together the clamp block 87 and Teflon® guides 96 form a guide block 88 that is hinged on one end by the hinge assembly 90 to the base plate

42. The latch assembly 92 at the other end of the guide block 88 is adapted to engage the catch 94, which is anchored by screws to the outer periphery of the bearing assembly 78, which in turn is anchored to the axle mounting plate 66.

The guide block 88 resides in a position adjacent to the position encoder assembly chain gear 60 and the latch mechanism 92 is engaged with the catch 94 when the clamp 64 is engaged to maintain engagement of the position encoder assembly chain gear 60 with the chain 22. As illustrated in FIGS. 4, 4A, and 5, the latch assembly 92 can be disengaged from the catch 94. The guide block 88 can then be moved to a position in which its end bearing the latch assembly 92 that lies opposite the end fastened to the hinge 90 is moved to a position remote from the position encoder assembly chain gear 60. In this disengaged position, depicted in FIGS. 4A and 5, the releasable clamp 64 releases the chain 22 from engagement with the position encoder assembly chain gear 60.

The hinge assembly 90 includes a pair of hinge arms 98 and 100 which are respectively anchored to hinge mounting rods 102 and 104. The hinge mounting rods 102 and 104 are formed as the legs of a U-shaped structure. The legs forming the hinge mounting rods 102 and 104 are pass through openings in the walls 105 of a hinge cup 106 that are below the level of base plate 42, as viewed in FIGS. 4 and 4A. The hinge cup 106 has mounting flanges 107 secured by bolts 108 to the base plate 42, as illustrated in FIG. 5.

At their opposite ends, the hinge arms 98 and 100 are rotatably coupled to hinge pins 110 and 112, respectively, which are secured to the lower extremities of the walls of a channel-shaped mounting bracket 114. The channel-shaped mounting bracket 114 is set into a longitudinal channel 116 defined in the outer, convex, generally cylindrical wall of the guide block 88, as best illustrated in FIG. 7. Machine bolts 118 anchor the channel-shaped mounting bracket 114 in the channel-shaped slot 116 in the guide block 88.

A wire coil spring (not visible) is disposed about the hinge pin 110. The ends of this coil spring act against the hinge arms 98 and 100, tending to force them apart from each other. This spring action serves to urge the guide block 88 toward the fully engaged position of FIG. 4 from the position of FIG. 4A, once it has been rotated inwardly toward the position encoder assembly chain gear 60 beyond the position depicted in FIG. 4A. This spring thereby aids in asserting pressure so that the chain links 24 fully engage the position encoder assembly chain gear 60 as the chain 22 travels relative to the chain hoist 14.

The latch assembly 92 includes a latch mounting bracket 120 having a pair of mutually parallel, mounting ears 122 projecting outwardly away from the top end of the clamp block 87, as best depicted in FIG. 5. The latch assembly 92 also includes a pair of generally flat latch members 124 and 126 which are coupled together in telescopic engagement. At one of its ends the latch member 124 has a mounting sleeve 128 that is wrapped about the transversely extending spine portion of a very stiff latch mounting spring 130. The transverse, linear spine portion of the latch mounting spring 130 extends transversely beyond the mounting sleeve 128 through openings near the back of the latch mounting bracket ears 122, as viewed in FIGS. 4 and 4A. The latch mounting spring 130 has coiled loops 132 at the ends of its transversely extending linear spine portion about which the mounting sleeve 128 is wrapped, and latch mounting spring ends 134 which are inserted into openings 135 in the latch mounting bracket ears 122 nearest the catch 94. The openings in the mounting ears 122 of the latch mounting bracket 120 through which the wire of the latch mounting spring 130 passes are not circular. Rather, the openings that receive the spine of the spring 130 and also the openings 135 that receive the spring ends 134 are elongated within the structure of the mounting ears 122. This permits the portions of the latch mounting spring 130 passing therethrough to move slightly toward and away from the axis of rotation 82 of the position encoder assembly gear shaft 62. This feature provides a slight degree of flexure of the latch mounting sleeve 128 toward and away from the axis of rotation 63.

The latch mounting spring 130 and the hinge spring wound about the hinge pin 110 are quite strong and stiff so that, when the latch assembly 92 is engaged with the catch 94, as illustrated in FIGS. 2 and 3, the guide block 88 is held firmly in position relative to the base plate 42 and relative to the axle mounting plate 66. Nevertheless, the latch mounting spring 130 does provide a very slight yielding connection of the guide block 88 relative to the axle mounting plate 66 to prevent any bent or misshaped link 24 of the chain 22 from becoming jammed as it passes between the position encoder assembly chain gear 60 and the guide block 88. This avoids a condition in which the chain 22 could jam and severely damage the position encoder assembly 10.

The latch member 124 is shaped as a flat plate having a circular opening therein and longitudinal edges that curve around to form channels that receive the outer edges of the slightly narrower latch plate 126. The latch member 126 is thereby reciprocally removable in a telescopic manner within the confines of the channels formed at the outer edges of the latch member 124.

The latch member 126 has at its distal extremity a transversely extending curved hook 136 that is configured to engage a corresponding, oppositely disposed hook 138 on the latch 94. In its flat portion the latch member 126 has an oblong cam slot 140 through which the narrow neck of a clamping pin 142 passes. The cam slot 140 is not parallel to but is inclined relative to the alignment of the mounting sleeve 128. The head of the clamping pin 142 is slightly larger than its neck and slides against the face of the flat portion of the latch member 126. At its other end the neck of the clamping pin 142 extends into a disc-shaped latch tightening turret 144. As best illustrated in FIGS. 3 and 5, the pin 142 is eccentrically mounted relative to the center of the latch tightening turret 144. The latch tightening turret 144 may be rotated about its center by twisting the ears of a butterfly handle 146.

The chain guide 88 of the releasable clamp 64 is mounted to the base plate 42 of the position encoder assembly housing or frame 40 by the hinge assembly 90. When engaged and tightened, as shown in FIG. 3, the latch mechanism 92 draws the chain guide 88 toward the position encoder assembly chain gear 60 to thereby press the chain 22 toward the position encoder assembly chain gear 60 to enhance engagement of the chain with the position encoder assembly chain gear 60.

The cam interaction between the eccentrically mounted clamping pin 142 and the cam slot 140 as controlled by the latch tightening turret 144 and the butterfly handle 146 serves as a tightening mechanism for drawing the latch assembly 92 toward the catch 94 when the latch assembly 92 is engaged with the catch 94.

When the hooks 136 and 138 of the latch assembly 92 and the catch 94, respectively, are aligned with each other as illustrated in phantom in FIG. 4, clockwise twisting of the butterfly handle 146, as viewed in FIG. 3, causes the latch tightening turret 144 to rotate, thereby carrying the eccentrically mounted cam pin 142 in the oblong cam slot 140 from a position proximate the latch 94 to a position remote therefrom, as illustrated in FIG. 3. This eccentric cam action has the effect of pulling the latching member 124 toward the position encoder assembly chain gear axis of rotation 82, thereby increasing the grip between the hooks 136 and 138 and enhancing the force with which the guide block 88 bears radially inwardly toward the axis of rotation 82. The tightening mechanism thereby enhances the force with which the guide block 88 presses the chain 22 toward the axis of rotation 82 of the position encoder assembly chain gear 60 once the hook 136 of the latch assembly 92 is engaged with the catch 94.

When the latch tightening mechanism has been engaged in this manner, the guide block 88 forces the links 124 of the chain 22 tightly against the corresponding pockets defined in the surface of the position encoder assembly chain gear 60, thereby ensuring complete engagement of the chain 22 against the position encoder assembly chain gear 60. This tight engagement between the chain 22 and the position encoder assembly chain gear 60 ensures that each incremental longitudinal movement of the chain 22 relative to the chain hoist 14 produces a corresponding, proportional rotational movement of the position encoder assembly chain gear 60 and the gear shaft 62 to which it is attached. Nevertheless, due to the actions of the hinge spring disposed about the hinge pin 110 and the latch mounting spring 130, the links 24 of the chain 22 cannot become jammed in between the guide block 88 and the position encoder assembly chain gear 60.

Figure 8:
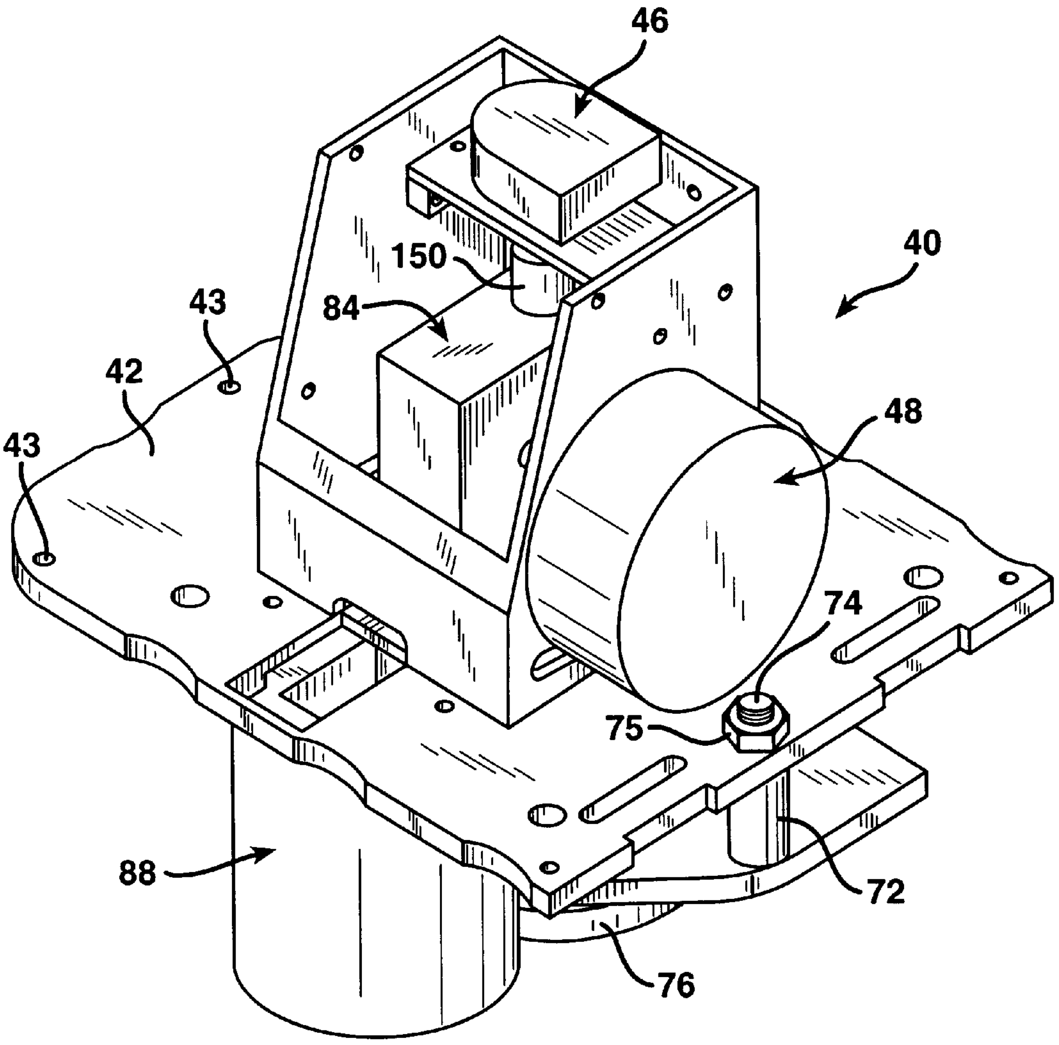
FIG. 8 is a perspective view from the back side of the position encoder assembly of FIG. 3 shown with the housing cover removed.

The components of the position encoder assembly 10 that are protected by the cover 44 of the housing 40 are illustrated in FIGS. 7 and 8. As shown in those drawing figures, the gear shaft 62 extends into the speed reducing gearbox 84. There are two outputs from the gearbox 84. The first output appears as an output drive 150 that is axially aligned with the position encoder assembly gear shaft 62 along the axis of rotation 82. There is no speed alteration between the input of the gear shaft 62 and the output shaft 150. The output shaft 150 is coupled in a conventional manner to the encoder or sensor 46, which is a precision optical incremental encoder. The precision optical incremental encoder 46 completes one revolution for no more than about every fourth link 24 of the chain 22 that passes by and rotates the position encoder assembly chain gear 60.

The output of the precision optical incremental encoder 46 from the position encoder assembly 10 appears on wires in a cable 154, illustrated in FIG. 1. Since the encoder disc of the precision optical incremental encoder 46 performs a complete 360° rotation for each four links 24 of the chain 22 that pass between the position encoder assembly gear 60 and the guide block 88, the output on cable 154 is highly precise. This output is utilized as an input to a computer to control the operation of the chain hoist 12. The electrical connections from the computer to the chain hoist 12 are conventional and are not illustrated in the drawing figures.

The speed reducing gearbox 84 also produces an output indicated at 152 in FIG. 7 that is substantially reduced in speed from the input speed of the gear shaft 62. More specifically, the output 152 is at a speed reduction of 100:1. The sensor or encoder 48 is an absolute electronic encoder with a battery backup. The absolute encoder 48 rotates at a speed which is but a small fraction of the rate of rotation of the precision encoder 46.

The outputs of the absolute encoder 48 are carried on electrical wires in the cable 154, illustrated in FIG. 1. The absolute encoder 48 is geared down by the gears in the gear speed reduction box 84 so that the encoder 48 will rotate an angular distance of less than 360° for fifty feet of travel of the chain 22. Since most applications use chains 22 that are sixty feet in length, the position output of the absolute encoder 48 represents an absolute position to a computer connected thereto. In some applications where one hundred foot chains are utilized, the speed reduction of the gearbox 84 should be even greater, such as at a ratio of 200:1.

Figure 9:
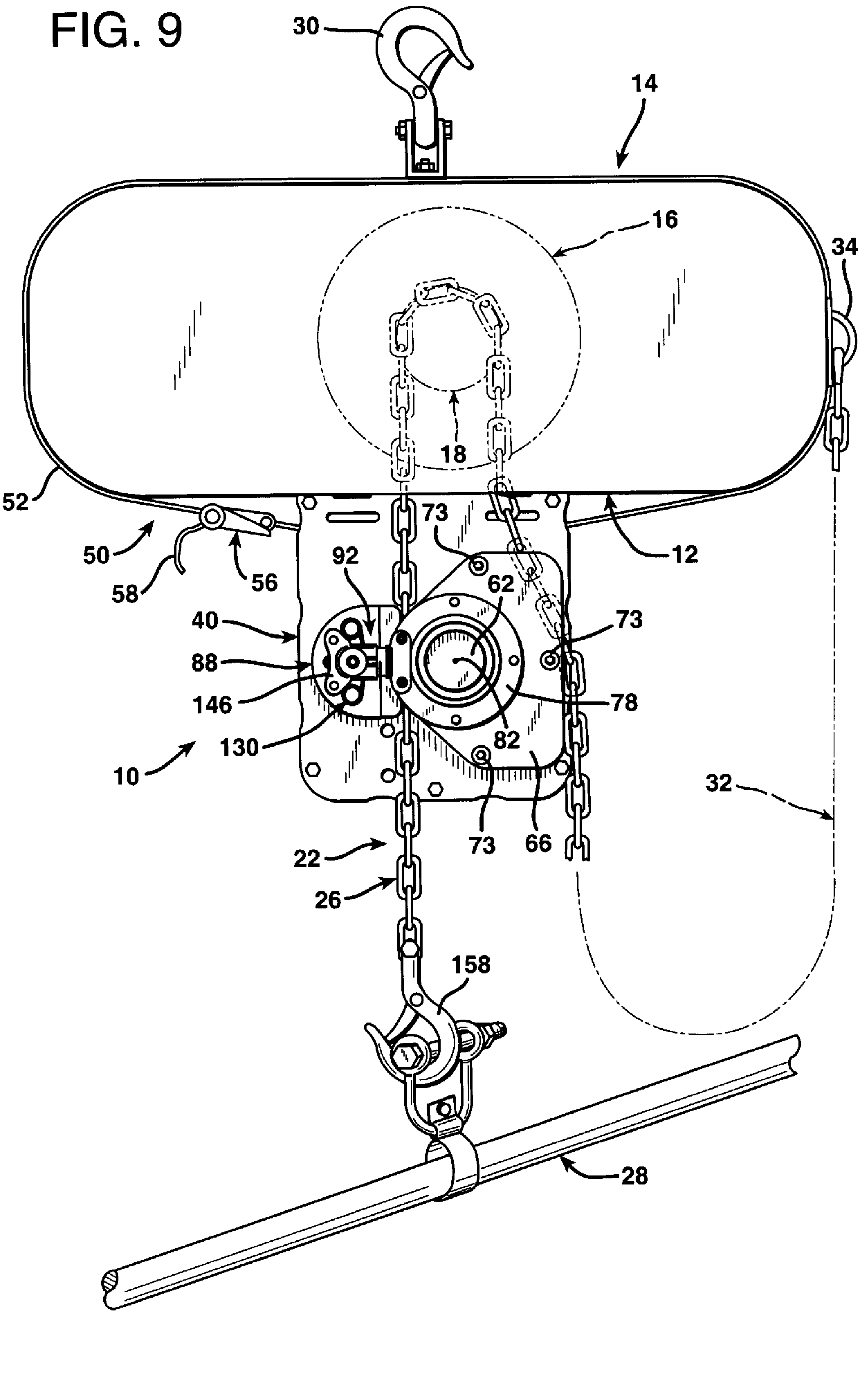
FIG. 9 illustrates an alternative manner of mounting the chain hoist and position encoder assembly of FIG. 1 relative to a load and an overhead support.

FIG. 9 illustrates an alternative arrangement in which the position encoder assembly 10 may be employed with the chain hoist 14. In this arrangement the chain hoist 14 is inverted from the position depicted in FIGS. 1 and 2, and is held suspended by the hook 30 from an overhead support. The chain 22 is connected by means of a hook 158 to the load 28. The chain 22 passes upwardly from the hook 158 and is engaged with the position encoder assembly chain gear 60. The chain 22 is held engaged with the gear 60 by the guide block 88 by means of the latching assembly 92 as previously described. The portion of the chain under tension passes upwardly through the position encoder assembly 10 and into the access opening 22 of the chain hoist housing 12 and around the gear 18 located therewithin. The chain hoist motor 16 pulls the portion 26 of the chain in tension upwardly, or plays it out, as controlled in a conventional manner. The slack portion 32 of the chain 22 hangs from the chain hoist casing 12 in a slack loop as illustrated. The spacing sleeves 68, 70, and 72 of the position encoder assembly 10 guide the slack portion of the chain 22 away from the chain gear 60 of the position encoder assembly 10, so that it cannot become fouled in the precision encoder assembly chain gear 60.

Undoubtedly, numerous variations and modifications of the invention will become readily apparent to those familiar with chain hoists and position encoder assemblies. For example, magnetic encoders could be substituted for the optical encoders 46 and 48. Also, the system need not necessarily employ dual sensors 46 and 48, but could employ either a precision encoder 46, an absolute encoder such as the absolute encoder 48 that is operated at a speed significantly reduced from the speed of rotation of the precision encoder assembly chain gear 60, or some output at an intermediate speed of rotation.

Also, while the releasable clamp 64 illustrated represents a preferred embodiment of a device for ensuring engagement between the position encoder assembly chain gear 60 and the chain 22, other types of releasable clamp mechanisms may also be utilized. In addition, different types of releasable connectors 50 may be substituted for the ratchet clamp illustrated in order to firmly, but removably, attach the position encoder assembly 10 to the casing 12 of the chain hoist 14. For example, the housing 40 could be provided with magnets that tightly hold the housing 40 of the position encoder assembly 10 in position against the casing 12 of the chain hoist 14. Accordingly, the scope of the invention should not be construed as limited to the specific embodiments depicted and described.

What is claimed is:

1. A removable position encoder assembly for attachment to a chain hoist that has a casing into which and with respect to which a chain travels comprising:

a position encoder assembly housing;

a releasable connector that firmly couples said position encoder assembly housing externally on said chain hoist casing and holds said position encoder assembly housing in a fixed position relative to said chain hoist casing;

a position encoder assembly chain gear rotatably mounted relative to said position encoder assembly housing so that said precision encoder assembly chain gear engages said chain externally from said chain hoist casing as said chain travels relative to said chain hoist casing;

a releasable clamp anchored relative to said position encoder assembly housing and engageable to maintain engagement of said precision encoder assembly chain gear with said chain so that linear movement of said chain produces a proportional rotational movement of said position encoder chain gear; and an encoder mounted on said position encoder assembly housing and which detects rotational movement of said position encoder assembly chain gear and provides output signals indicative of the extent and direction of rotational movement of said position encoder assembly chain gear relative to said chain hoist casing.

2. A position encoder assembly according to claim 1 wherein said releasable connector is formed of a ratchet strap which passes through said position encoder assembly housing and about said chain hoist casing and which is cinched to form a loop that tightly grips said chain hoist casing therewithin, thereby releasably holding said position encoder assembly housing tightly against said chain hoist casing.

3. A position encoder assembly according to claim 1 wherein said position encoder assembly housing includes a flat base plate and a flat axle mounting plate spaced from and held parallel to said base plate, and said chain gear is secured to a gear shaft that is mounted by bearing rings at said base plate and at said axle mounting plate for rotation about a chain gear axis that is perpendicular to said base plate, and said releasable clamp includes a guide block, a hinge that secures one end of said guide block to said base plate, a latch at the other end of said guide block, and a catch anchored to said axle mounting plate, whereby said guide block resides in a position adjacent to said chain gear and said latch is engaged with said catch when said releasable clamp is engaged to maintain engagement of said chain gear with said chain and said latch is disengaged from said catch and said guide block is moved to a position in which said other end thereof is remote from said chain gear to thereby release said chain from engagement with said chain gear.

4. A position encoder assembly according to claim 3 wherein said clamp further comprises a tightening mechanism for drawing said latch toward said catch when said latch is engaged with said catch to thereby press said guide block against said chain and toward said gear axis.

5. A position encoder assembly according to claim 4 further comprising stiff, resilient springs in said hinge and in said latch.

6. A position encoder assembly according to claim 1 wherein said encoder is a precision optical incremental encoder.

7. A position encoder assembly according to claim 6 wherein said precision optical incremental encoder completes one revolution for no more than about every fourth link of said chain that passes said position encoder assembly chain gear.

8. A position encoder assembly according to claim 7 further comprising a speed-reducing gearbox that provides a speed reduced output at a speed reduction of at least about one hundred to one and an absolute optical incremental encoder coupled to said speed reduced output of said speed-reducing gearbox.

9. A position encoder assembly removably and externally attachable to a chain hoist having a casing with a chain that enters said casing comprising:

a position encoder assembly body;

a releasable connector that is engageable to secure said position encoder assembly body to said chain hoist casing in a fixed disposition relative thereto and which is disengageable to permit removal of said position encoder assembly body from said chain hoist;

a position encoder assembly chain gear mounted for rotation relative to said position encoder assembly body and engageable with said chain externally of said chain hoist casing;

a releasable clamp mounted on said position encoder assembly body and which is operable to hold said chain in engagement with said position encoder assembly chain gear and alternatively to release said chain from said position encoder assembly chain gear; and an encoder mounted on said position encoder assembly body and which is responsive to rotation of said position encoder assembly chain gear to emit signals indicative of the direction and extent of rotation of said position encoder assembly chain gear relative to said position encoder assembly body.

10. A position encoder assembly according to claim 9 wherein said releasable connector is comprised of a ratchet strap connected to said position encoder assembly body and which forms a loop about said chain hoist casing and which is tightened to hold said position encoder assembly body tightly against said chain hoist casing.

11. A position encoder assembly according to claim 9 further comprising bearing plates mounted on said position encoder assembly body and between which said position encoder assembly chain gear turns in rotation about a position encoder assembly chain gear axis of rotation that is perpendicular to both said bearing plates, and said clamp is comprised of a guide block mounted on one of said bearing plates, and said clamp has a latch on said guide block and a catch secured to the other of said bearing plates, whereby said latch is engageable with said catch with said chain passing between said bearing plates and between said position encoder assembly chain gear and said guide block, and said guide block provides a force that presses said chain against said chain gear and toward said position encoder assembly gear axis of rotation.

12. A position encoder assembly according to claim 11 further comprising at least one stiff spring interposed between said guide block and said bearing plates.

13. A position encoder assembly according to claim 11 wherein said clamp is further comprised of a tightening mechanism that enhances the force with which said guide block presses said chain toward said position encoder assembly gear axis of rotation once said latch is engaged with said catch.

14. A position encoder assembly according to claim 9 wherein said encoder comprises a precision encoder that makes one complete revolution with the passage of no more than about four links of said chain past said position encoder assembly body.

15. A position encoder assembly according to claim 14 further comprising a speed reducer within said position encoder assembly body and an absolute encoder coupled to said speed reducer to rotate at a fraction of the rate of rotation of said precision encoder.

16. In a chain hoist having a casing with a chain opening and a chain extending into said chain opening the improvement comprising: a detachable position encoder assembly including a position encoder assembly frame rigidly and removably attached to the exterior of said chain hoist casing and which includes a position encoder assembly chain gear mounted on said position encoder assembly frame for rotation relative thereto and engageable with said chain; a releasable clamp anchored to said position encoder assembly frame and operable to alternatively hold said chain in engagement with said position encoder assembly chain gear and to release said chain from said position encoder assembly chain gear; and an encoder mounted on said position encoder assembly frame and which detects rotation of said precision encoder assembly chain gear relative to said position encoder assembly frame and provides output signals indicative of the direction and extent of rotation of said position encoder assembly chain gear relative to said position encoder assembly frame.

17. A chain hoist according to claim 16 further comprising a tightenable strap for removably attaching said position encoder assembly frame to said exterior of said chain hoist casing.

18. A chain hoist according to claim 17 wherein said releasable clamp is comprised of a chain guide mounted to said position encoder assembly frame and a latch mechanism for drawing said chain guide toward said position encoder assembly chain gear to thereby press said chain toward said position encoder assembly chain gear to enhance engagement of said chain with said position encoder assembly chain gear.

19. A chain hoist according to claim 18 further comprising means interposed between said chain guide and said position encoder assembly frame for preventing said chain from jamming between said position encoder assembly chain gear and said chain guide.

* * * * *